United States Patent Office 3,257,864
Patented June 28, 1966

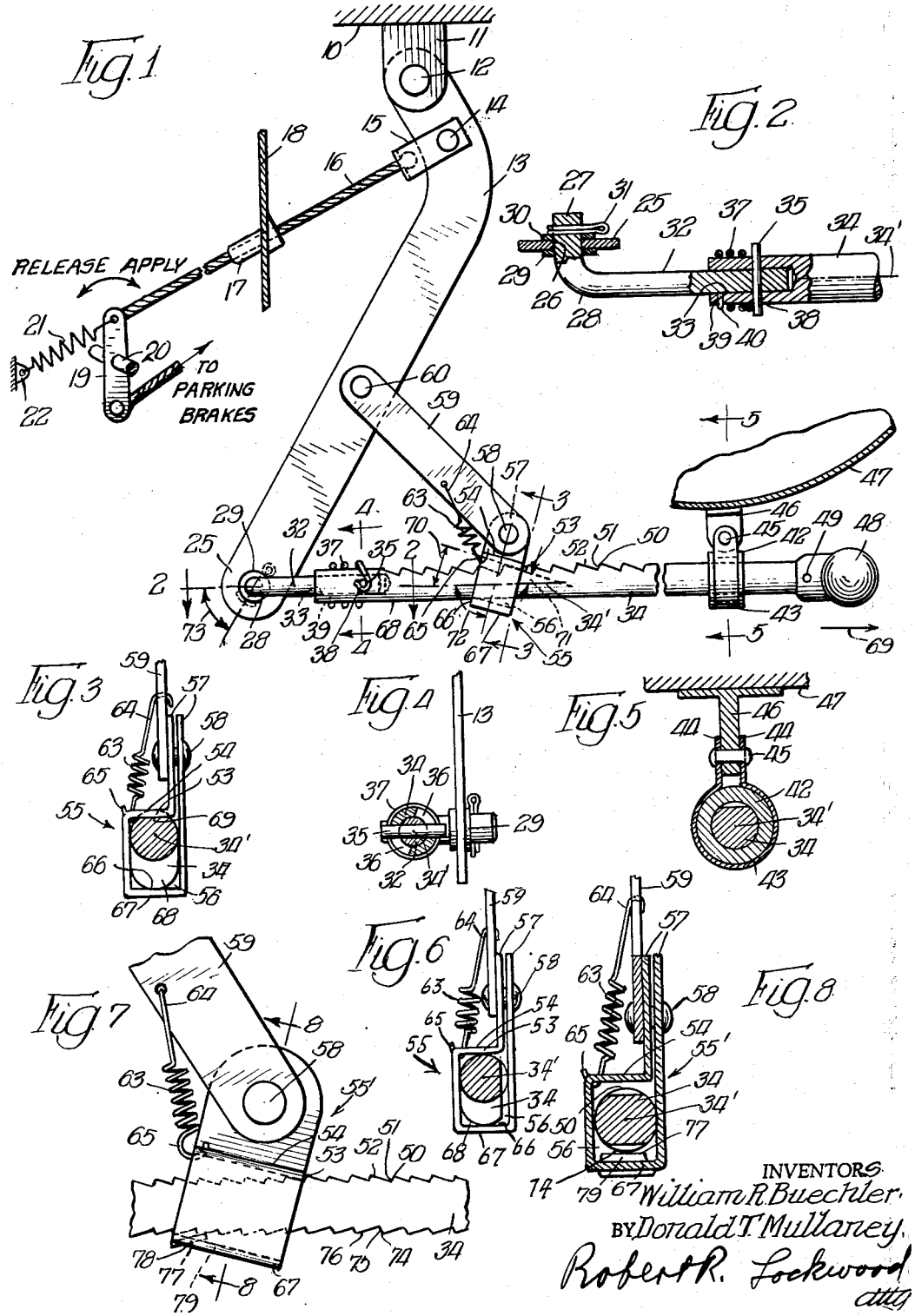

3,257,864
CONTROL LEVER AND LINKAGE SYSTEM
William R. Buechler, Birmingham, and Donald T. Mullaney, Warren, Mich., assignors, by mesne assignments, to William R. Buechler, Birmingham, Mich.
Filed July 30, 1963, Ser. No. 298,734
10 Claims. (Cl. 74—541)

This invention relates, generally, to control lever and linkage systems for use in applying and releasing a brake, such as the parking brake or brakes of a vehicle, and it has particular relation to such systems having a slidable operator.

Among the objects of this invention are: To provide in a new and improved manner for moving a brake cable pull lever to the brake applying position and for releasing it to release the brake; to mount the pull lever to rotate about a fixed axis at one end with a pull rod pivoted to its distal end having ratchet means under the control of a ratchet pawl connected to the pull lever; to provide for releasing the ratchet pawl by rotating the pull rod about its longitudinal axis; to construct the ratchet pawl in such manner that it cooperates with ratchet teeth along one side of the pull rod and reacts against the opposite side of the pull rod; and to provide ratchet teeth along opposite sides of the pull rod and to have the ratchet pawl cooperate alternately with the oppositely located ratchet teeth and alternately with the opposite sides of the pull rod.

In the drawings:

FIG. 1 is a view, in side elevation, of a control lever and linkage system embodying this invention.

FIG. 2 is a horizontal sectional view taken generally along the line 2—2 of FIG. 1.

FIG. 3 is a sectional view taken generally along the line 3—3 of FIG. 1 and showing the ratchet pawl or locking collar in elevation.

FIG. 4 is a vertical sectional view taken generally along the line 4—4 of FIG. 1.

FIG. 5 is a vertical sectional view taken generally along the line 5—5 of FIG. 1.

FIG. 6 is a view, similar to FIG. 3, but showing the pull rod turned through 90° about its longitudinal axis to the brake releasing position.

FIG. 7 is a view, in side elevation, of a modified form of ratchet pawl or locking collar in cooperation with a modified form of pull rod provided with ratchet teeth along opposite sides.

FIG. 8 is a sectional view taken generally along the line 8—8 of FIG. 7.

Referring now particularly to FIG. 1 of the drawing it will be observed that the reference character 10 designates a car frame part on which a fulcrum bracket 11 is stationarily mounted. Pivotally mounted at 12 on the fulcrum bracket 11 is a brake cable pull lever 13 to which at 14 a clevis 15 is pivoted. A brake applying cable 16 is connected at one end to the clevis 15 and it extends through a guide fitting 17 in a car panel 18 for connection to the brake or brakes, such as the parking brake or brakes, of the vehicle. For illustrative purposes the cable 16 is shown as being connected to a lever 19 on a shaft 20 which is mechanically connected to the braking system. A brake return spring 21 is anchored at 22 to a suitable part of the car frame and also is connected to the distal end of the lever 19 for biasing the brake system to the released position. It will be understood that on rotation of the brake cable pull lever 13 in a counterclockwise direction about a pivot 12, the brake applying cable 16 is tensioned against the biasing action of the spring 21 and the shaft 20 is rotated to apply the parking brakes. On release of the force rotating the lever 13 in a brake applying direction, the brake return spring 21 functions to return the lever 13 to the initial position and to release the brakes. It will be understood that this arrangement for applying the brakes is typical and that other suitable brake applying means can be employed using for the operating member a lever corresponding to the brake cable pull lever 13. It remains to describe how the brake cable pull lever 13 is controlled in accordance with the present invention.

The distal end of the brake cable pull lever 13 is indicated at 25 and it is provided with an opening 26 through which an end portion 27 of an inner pivot rod 28 extends. The inner pivot rod 28 is of L-shape with the short arm providing the end portion 27 and having an upset flange 29 thereon for bearing against one side of the distal end 25 of the pull lever 13. On the opposite side there is a flat washer 30 and the assembly is held in place by a cotter pin 31.

The inner pivot rod 28 has a shank 32 which forms a long arm of the L-shape and it is rotatably mounted in a socket 33 that extends into one end of a pull rod 34 that preferably is circular in cross section. As described hereinafter provision is made for rotating the pull rod 34 about its longitudinal axis 34′, FIGS. 3 and 6, to release the brake cable pull lever 13 for movement to the brake released position.

The shank 32 is held against endwise movement in the socket 33 of the pull rod 34 by a transversely extending retainer or stop pin 35. As shown in FIG. 4 the pin 35 extends through the shank 32 and radially therefrom through rod slots 36—36 that are located in diametrically opposite positions in the walls of the socket 33. The ends of the rod slots 36—36 serve to limit the relative rotation of the pull rod 34 about its longitudinal axis 34′ with respect to the shank 32 of the inner pivot rod 28.

With a view to biasing the pull rod 34 about its longitudinal axis 34′ to the position shown in FIGS. 1 to 5 of the drawings a torsion spring 37 is located around the exterior of the socket 33. One end 38 is hooked over a protruding end of the retainer or stop pin 35 while the other end 39 is anchored in a radial opening 40 that extends through a wall of the socket 33. The convolutions of the torsion spring 37 loosely fit around the socket 33 with the fit being such as to permit it to bias the pull rod 34 to the locking position shown in FIG. 1.

The end of the pull rod 34 opposite the socket 33 is guided in a bushing 42 that may be formed of suitable plastic material and is carried by a circular support 43 having projecting ends 44—44, FIG. 5, through which a rivet 45 extends for securing them pivotally to a bracket 46 of generally T-shape. The bracket 46 has its central stem extending between the projecting ends 44—44 and its base secured suitably to the underside of the instrument panel 47 of the vehicle. A handle 48, secured by a transverse pin 49, is provided at the outer end of the pull rod 34 to provide a hand hold for the operator to grasp and apply a tension force to the pull rod 34 for the purpose of rotating the brake cable pull lever 13 in a counterclockwise direction to apply the parking brakes. Not only does the bushing 42 serve to guide the pull rod 34 in its longitudinal movement but also its pivotal mounting by the support 43 on the bracket 46 by the rivet 45 enables the pull rod 34 to resist the biasing action of the brake return spring 21 in urging the brake cable pull lever 13 to the brake released position.

With a view to holding the pull rod 34 in any position to which it may be moved by application of endwise force from the handle 48 a surface is provided in the form of ratchet teeth 50 which extend transversely along the upper side of the pull rod 34. Each ratchet tooth 50 has a locking surface 51 at a suitable angle to the longitudinal axis 34' and extending from the base thereof is a bearing surface 52 which is located in a plane normal to the plane containing the locking surface 51. A locking surface 53 is provided at one end of an upper side 54 of a ratchet pawl in the form of a locking collar, shown generally at 55, that may be formed of metal strap. In the positon shown in FIG. 1 the locking surface 53 is in engagement with the locking surface 51 of the adjacent tooth 50. From FIG. 3 it will be observed that the locking collar 55 has a generally rectangular opening 56 the width of which is slightly greater than the diameter of the pull rod 34 while the length is somewhat greater to permit the locking collar 55 to assume the cocked position shown in FIG. 1 and permit it to ratchet along the teeth 50 on the upper side of the pull rod 34. The locking collar 55 has upstanding ends 57—57 which are pivoted on a rivet 58 that extends through one end of a reaction link 59 the other end of which is pivoted at 60 to the brake cable pull lever 13 at a position intermedite the distal end 25 and the pivot 12.

The locking collar 55 is biased to the position shown in FIG. 1 by a collar biasing tension spring 63. One end 64 of the spring 63 is anchored to the reaction link 59 intermediate its ends while the other end 65 is anchored to the upper side 54 of the locking collar 55 at the end opposite the end where the locking surface 53 is located.

The coil tension spring 63 acts to urge the locking collar 55 toward the reaction link 59. This movement is limited, in part, by the engagement of the under surface of the upper side 54 of the locking collar 55 with the inclined bottom surface 52 of the ratchet tooth 50 with which it happens to be engaged. This locking movement is also limited by a shoulder 66 at one end of the underside 67 of the locking collar 55 which engages the under surface 68 of the pull rod 34. This construction permits the pull rod 34 to be drawn through the bushing 42 in a brake applying direction indicated by the arrow 69 in FIG. 1 while the locking collar 55 ratchets along the ratchet teeth 50 from one to the other.

The length of the rectangular opening 56 is indicated at 70 in FIG. 1 between the under surface of the upper side 54 and the upper surface of the underside 67 of the locking collar 55. In the locked position the angle between the plane containing the under surface of the upper side 54 and the longitudinal axis 34' of the pull rod 34 is indicated at 71. This angle is complementary to the angle 72 between the longitudinal axis 34' of the pull rod 34 and the longitudinal axis of the locking collar 55 which extends through the pivot provided by the rivet 58. It will be noted that this construction permits the locking collar 55 to cock to the limit of the space indicated at 70 which is also the distance from the inclined bottom surface 52 or machined tooth back angle to the point where the shoulder 66 engages the under side 68 of the pull rod 34 or the lower rod diametral surface at the point here of collar contact. Since the bottom surface of the upper side 54 bottoms on the inclined bottom surface 52 of the tooth 50 with which it is in engagement, the locking surface 53 buttresses squarely upon the adjacent locking surface 51 for any position of the pull rod 34.

As the pull rod 34 is drawn through the bushing 42, the locking collar 55 freely allows such movement since it ratchets along the ratchet teeth 50 during brake application. The forces acting on the locking collar 55 tend to rotate it clockwise about the rivet 58 and cause it to lock firmly on the pull rod 34 in such manner that it is self locking. As the movement of the pull rod 34 continues in the brake applying direction indicated by the arrow 69, the angle 73 between the brake cable pull lever 13 and the longitudinal axis 34' of the pull rod 34 is increased, the increase being in proportion of the extent of travel of the pull rod 34 through the bushing 42. The resulting increasing reaction load is transmitted through the reaction link 59 on release of the pull on the handle 48 as the locking collar 55 engages the next locking surface 51. Thus the pull lever 13 and the pull rod 34 are effectively locked at the particular angle 73 where the pull is no longer applied to the pull rod 34. The reaction is further applied to the pull rod 34 by the circular support 43 which is anchored by the rivet 45 to the bracket 46 which is secured to the underside of the instrument panel 47.

When it is desired to release the parking brakes, the pull rod 34 is rotated about its longitudinal axis 34' by the handle 48. This is permitted since the retainer or stop pin 35 extends through the arcuate rod slots 36—36 as seen in FIG. 4. Rotation of the pull rod 34 in a clockwise direction to the position shown in FIG. 6 carries the locking surface 51 with which the locking surface 53 on the upper side 54 of the locking collar 55 was in engagement out of engagement. As a result the return movement of the pull rod 34 under the influence of the brake return spring 21 no longer is resisted by the locking collar 55. Merely by holding the handle 48 in the released position and not applying a tension force thereto, the brake return spring 21 is able to release the brakes and to return the brake cable pull lever 13 and the linkage mechanism connected thereto, including the pull rod 34, to the brake released position. Since the rotation of the pull rod 34 about the longitudinal axis 34' involves further tensioning the torsion spring 37, upon release of the handle 48, the torsion spring 37 acts to rotate the pull rod 34 to the position shown in FIG. 3 of the drawing where the locking collar 55 is again in operative relation with respect to the ratchet teeth 50.

With a view to obtaining an increased number of locking positions, the construction shown in FIGS. 7 and 8 can be employed. Here it will be observed that ratchet teeth 74 are provided on the lower side of the pull rod 34 or on the side directly opposite the side where the ratchet teeth 50 are located. Each ratchet tooth 74 has a locking surface 75 at right angles to an inclined bottom surface 76, these surfaces corresponding, respectively, to the surfaces 51 and 52 of the ratchet teeth 50. A tab 77 is struck up from the underside 67 of the locking collar 55' which in this instance is somewhat wider than is the locking collar 55. It will be noted that the tab 77 is struck up from the end 78 of the underside 67 of the locking collar 55' so as to provide a shoulder or end surface 79 that is arranged to buttress against the locking surface 75 of one of the ratchet teeth 74. The spacing between the locking surface 53 at the end of the upper side 54 and the shoulder or locking surface 79 of the tab 77 is such that alternate ratchet teeth 50 and 74 are engaged. In this manner the locking action provided by the locking collar 55' reacting against the pull rod 34 is such that it takes place alternately against either the locking surface 51 or the locking surface 75. In this manner it is possible to obtain twice the number of locked positions for the pull rod 34 using the two sets of ratchet teeth than is possible when only the single set is employed.

Numerous advantages are provided through the use of the control lever and linkage system disclosed herein. There is a minimum of parts required for controlling the movement of the brake cable pull lever 13 with no sacrifice in the number of locked positions that are available to the operator. This is doubled when the double acting modification shown in FIGS. 7 and 8 is employed. The locking collar 55 is positively positioned and guided relative to the ratchet teeth 50 along the pull rod 34 since the locking collar 55 surrounds the pull rod 34. The operating mechanism is simple and efficient in assembly and manufacture. Since the locking collar 55 is located intermediate the ends of the pull rod 34, it can be positioned beyond the instrument panel 47 in a location where it is concealed thereby. As a result only the bushing 42 and parts immediately associated therewith together with the projecting end of the pull rod 34 and the handle 48 are visible to the operator from his normal position. By employing the locking collar 55 a simple yet extremely rugged construction is provided which is relatively inexpensive to manufacture.

What is claimed as new is:

1. Mechanism for actuating a brake, such as a parking brake for a vehicle comprising, in combination:
   (a) a lever arranged and adapted to be connected to said brake and to be biased to a brake releasing position,
   (b) means for pivotally mounting said lever on said vehicle,
   (c) a pull rod pivotally connected to said lever for pivoting said lever upon longitudinal movement thereof to apply said brake,
   (d) means mounting said pull rod for rotation about its longitudinal axis,
   (e) ratchet teeth along said pull rod;
   (f) a locking collar loosely fitting around said pull rod and having:
      (1) a locking surface at one end for engaging one of said ratchet teeth, and
      (2) a shoulder at the other end for engaging the side of said pull rod opposite said ratchet teeth;
   (g) a reaction link pivotally connected at one end to said lever and at the other end to said locking collar, and
   (h) a spring means connected to said locking collar for biasing said locking surface of said locking collar into the path of the locking surface of one of said ratchet teeth and said shoulder into engagement with said pull rod,
   (i) said locking collar ratcheting along said pull rod as it is moved to apply said brake and holding it in any operative position to which it may be moved,
   (j) rotation of said pull rod about its longitudinal axis disengaging said locking collar from a ratchet tooth and permitting release of said brake.

2. The invention, as set forth in claim 1, wherein:
   (a) means limit the rotation of the pull rod about its longitudinal axis, and
   (b) means bias said pull rod to rotate it about its longitudinal axis to maintain the ratchet teeth in operative relation to the locking collar.

3. The invention, as set forth in claim 1, wherein:
   (a) the end of the pull rod connected to said lever has an endwise extending socket,
   (b) a shank of an L-shaped pivot rod is rotatably mounted in said socket and the short end is pivoted to said lever,
   (c) said socket includes at least one arcuate slot,
   (d) a stop pin extends from said shank into said arcuate slot, and
   (e) a spring reacts between said pull rod and said pivot rod and biases said pull rod about its longitudinal axis to maintain the ratchet teeth in operative relation to the locking collar.

4. The invention, as set forth in claim 1, wherein:
   (a) the pull rod is circular in cross section, and
   (b) the locking collar has a rectangular opening through which said pull rod extends the width of which is sufficient to permit said pull rod to turn freely therein and the length of which is sufficient to permit cocking of said locking collar relative to said pull rod under the biasing action of the spring.

5. The invention, as set forth in claim 4, wherein:
   (a) said locking surface on said locking collar is located at one end of the side thereof overlying the ratchet teeth, and
   (b) the shoulder is at the opposite end of the side of said locking collar opposite said ratchet teeth.

6. The invention, as set forth in claim 1, wherein:
   (a) additional ratchet teeth are located along the side of said pull rod opposite the side where the first mentioned ratchet teeth are located,
   (b) locking means is provided on said locking collar for engaging one of said additional ratchet teeth.

7. Mechanism for actuating a brake, such as a parking brake for a vehicle comprising, in combination:
   (a) a lever arranged and adapted to be connected to said brake and to be biased to brake releasing position,
   (b) means for pivotally mounting said lever on said vehicle,
   (c) a pull rod pivotally connected at one end to said lever and arranged and adapted on application of an endwise pull thereto to pivot said pull lever against the biasing force applied thereto to apply said brake,
   (d) means mounting said pull rod for rotation about its longitudinal axis,
   (e) means providing a ratchet surface along said pull rod;
   (f) a locking collar loosely fitting around said pull rod and having:
      (1) a locking surface at one end for engaging said ratchet surface, and
      (2) a shoulder at the other end for engaging the side of said pull rod opposite said ratchet surface; and
   (g) a reaction link pivotally connected at one end to said lever and at the other end to said locking collar,
   (h) said locking collar ratcheting along said pull rod as it is moved to apply said brake and holding it in any operative position to which it may be moved,
   (i) rotation of said pull rod about its longitudinal axis disengaging said locking collar from said ratchet surface and permitting release of said brake.

8. A mechanism comprising:
   (a) a lever pivotally connected to a support,
   (b) a pull rod operatively connected to said lever for longitudinal movement to pivot said lever,
   (c) means restricting rotation of said mechanism about the pivotal connection of said lever to said support, and
   (d) means interconnecting said lever and said rod for locking said rod in any one of various positions of movement in one direction and for selectively allowing free movement of said rod in the opposite direction.

9. A mechanism comprising:
   (a) a lever pivotally connected to a support,
   (b) a pull rod operatively connected to said lever for longitudinal movement to pivot said lever,
   (c) first means restricting rotation of said mechanism about the pivotal connection of said lever to said support,
   (d) second means disposed along said pull rod,
   (e) a locking collar disposed about said pull rod for engaging said second means to prevent longitudinal movement of said pull rod in one direction,
   (f) said pull rod disposed for rotational movement about the longitudinal axis thereof for preventing said locking collar from engaging said second means to allow free longitudinal movement of said pull rod in the opposite direction,
   (g) a reaction link interconnecting said lever and said locking collar, and
   (h) biasing means for urging said locking collar into engagement with said second means.

10. A mechanism for actuating a brake, such as a parking brake for a vehicle, comprising in combination:
    (a) a lever arranged and adapted to be connected to said brake and to be biased to a brake releasing position,
    (b) means for pivotally mounting said lever on said vehicle, (c) a pull rod pivotally connected at one end to said lever for pivoting said lever upon longitudinal movement thereof to apply said brake,
(d) means restricting rotation of said mechanism about said means for pivotally mounting said lever, and
(e) means interconnecting said lever and said pull rod for selectively holding said lever and said pull rod in any position to which said lever and said pull rod are operated by application of an endwise pull to said pull rod.

References Cited by the Examiner
UNITED STATES PATENTS
2,716,902  9/1955  Skareen _____ 74—541

MILTON KAUFMAN, *Primary Examiner.*